I. E. PALMER.
MACHINE FOR DRESSING WORSTED CORD.

No. 113,917.  Patented Apr. 18, 1871.

Witnesses
Isaac E. Palmer

United States Patent Office.

ISAAC E. PALMER, OF HACKENSACK, NEW JERSEY.

Letters Patent No. 113,917, dated April 18, 1871.

IMPROVEMENT IN MACHINES FOR DRESSING WORSTED CORD.

The Schedule referred to in these Letters Patent and making part of the same.

*To all whom it may concern:*

Be it known that I, ISAAC E. PALMER, of Hackensack, in the county of Bergen and State of New Jersey, have invented a new and useful Machine for Dressing Worsted Cord, of which the following is a full, clear, and exact description, reference being had to the accompanying drawing forming part of this specification, and in which—

Figure 1:
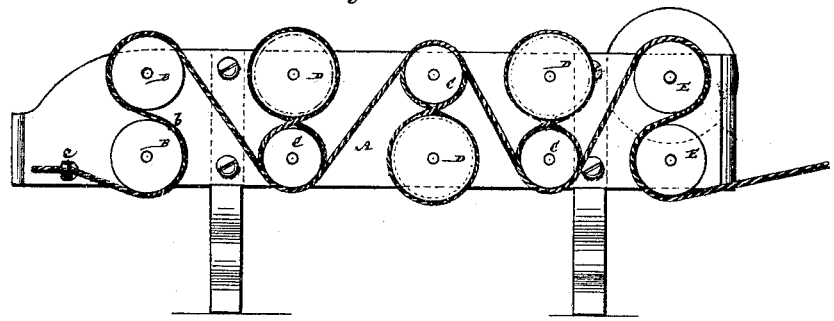
Figure 2:
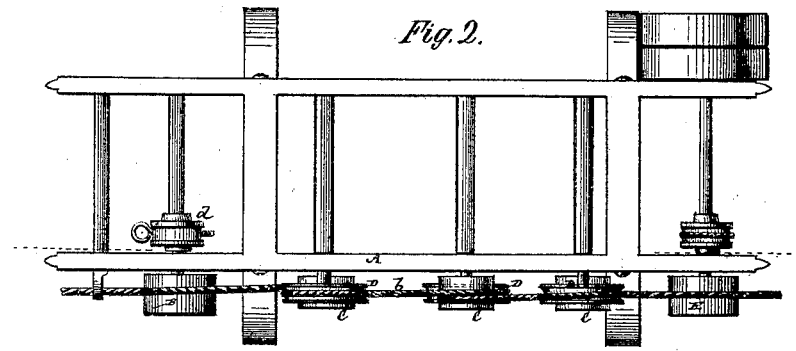

Figure 1 represents a side elevation of a machine constructed in accordance with my invention;

Figure 2, a plan of the same; and

Figure 3:
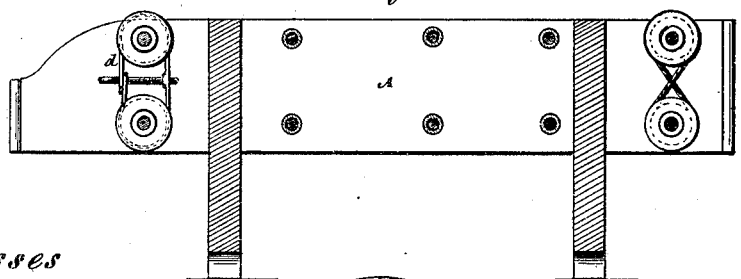

Figure 3, a longitudinal sectional elevation through the line $x\,x$ in fig. 2.

Figure 4:
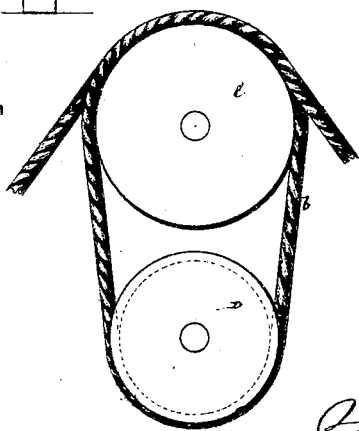

Figure 4 is a side view, on a larger scale, of one of the guide-pulleys and emery or holding-wheels, used in the machine under a different arrangement or run of the cord over said devices to that shown in fig. 1.

Similar letters of reference indicate corresponding parts.

My invention has for its object the dressing, or what has been called "scraping," of worsted cord, as heretofore done in a rude manner by hand devices, by causing adjacent lines of the cord as worked over or around and made to move in common with a hard roughened surface to bear down and hold upon the short projecting fibers of each other, and thus, by a process of pulling, as it were, from the points in the roughened surface as a close bearing or rest, to effect their detachment and so deprive the cord of furry matter and leave it smooth or clean.

The invention consists in a combination of guide-pulleys and emery or other suitable hard roughened wheels for the purpose, the same constituting a machine for what has heretofore been effected by hand, and accomplishing the work in a much more perfect and rapid manner.

Said guide-pulleys and wheels may be variously arranged and be used in any desired number; also, the cord be run over or around them either in an open or crossed manner.

The wheels I prefer to make of solid emery, but do not restrict myself to such, nor yet to an emery surface for the same; but consider emery as presenting the most suitable hard surface for the purpose, and consequently shall refer in the following description exclusively to emery-wheels.

Referring in the first instance to figs. 1, 2, and 3 of the drawing—

A represents the frame of the machine, and which may be of any desired construction.

B B are let-off pulleys for the cord $b$ to be dressed, and which may be conducted from a pile thereto through a guide, $c$, and be passed under the lower pulley and over the upper one, the let-off action being regulated by a friction-brake, $d$.

From the upper one of these pulleys the cord $b$ is run successively over or around a series of freely-hung emery wheels, C, and guide-pulleys D, the latter serving to direct the cord, which is crossed, in two close lines or rows around the emery-wheels, and to hug the latter, with which the cord travels in common as it is drawn upon by take-up pulleys E E, or otherwise.

Thus passing around and with the emery-wheels C, the one line of the cord has its protruding fibers, as the same is fed onto each wheel, caught by or passed under the adjacent line, which latter in its turn has its protruding fiber, as the same leaves the wheel, caught by the other row or line.

This hold of the fibers on the hard sharp points or surfaces of the wheels causes either one line or row of the cord to pull on and detach the protruding fibers from each other, and by a suitable disposition and number of wheels and guide-pulleys the whole surface of the cord on its every side and at every point may in this way be effectually dressed.

Instead of passing the cord in a crossed or close manner around the guide-pulleys and emery-wheels, it may have its double turn or run around the wheels effected in an open manner, as shown in fig. 4; but in such case it is desirable, in order to obtain an effective lap of the cord around said wheels, to make the latter of a larger diameter than the guide-pulleys, and furthermore desirable, in order to secure the two rows or lines of cord running in close contiguity, to set the axial lines of the pulleys and wheels more or less oblique to each other.

What is here claimed, and desired to be secured by Letters Patent, is—

The combination, in a machine for dressing worsted and other like cord, of guide-pulleys and emery or other hard roughened wheels arranged to rotate or travel in common with the cord as the latter, directed by the pulleys, passes in contiguous lines or rows around the wheels, substantially as specified.

ISAAC E. PALMER.

Witnesses:
 FRED. HAYNES,
 FERD. TUSCH.